US010310669B2

(12) United States Patent
Razurel et al.

(10) Patent No.: US 10,310,669 B2
(45) Date of Patent: Jun. 4, 2019

(54) MOTOR VEHICLE CONTROL DEVICE AND METHOD

(71) Applicant: DAV, Créteil (FR)

(72) Inventors: Guy Razurel, Creteil (FR); Gilles Pittion, Creteil (FR); Philippe Barathon, Creteil (FR); Ertugrul Taspinar, Creteil (FR)

(73) Assignee: DAV, Créteil (FR)

( * ) Notice: Subject to any disclaimer, the term of this patent is extended or adjusted under 35 U.S.C. 154(b) by 197 days.

(21) Appl. No.: 15/515,034

(22) PCT Filed: Sep. 29, 2015

(86) PCT No.: PCT/FR2015/052591
§ 371 (c)(1),
(2) Date: Jun. 14, 2017

(87) PCT Pub. No.: WO2016/051070
PCT Pub. Date: Apr. 7, 2016

(65) Prior Publication Data
US 2017/0293398 A1    Oct. 12, 2017

(30) Foreign Application Priority Data
Sep. 30, 2014    (FR) ..................................... 14 02204

(51) Int. Cl.
*G06F 3/041*    (2006.01)
*G06F 3/044*    (2006.01)
(Continued)

(52) U.S. Cl.
CPC ............ *G06F 3/0418* (2013.01); *B60K 35/00* (2013.01); *B60K 37/06* (2013.01); *G01D 3/0365* (2013.01);
(Continued)

(58) Field of Classification Search
CPC ....... G06F 3/0418; G06F 3/044; B60K 35/00; B60K 37/06; E05B 81/64; E05B 81/76; E05B 81/77; E05B 81/78; G01D 3/0365
(Continued)

(56) References Cited

U.S. PATENT DOCUMENTS 9,823,758 B2 * 11/2017 Pedersen ............. G06F 3/03545
2009/0256677 A1 * 10/2009 Hein ........................ B60R 25/00
340/5.72
(Continued)

FOREIGN PATENT DOCUMENTS

EP    1 881 605 A1    1/2008
WO    2014/113542 A1    7/2014

OTHER PUBLICATIONS

International Search Report issued in PCT/FR2015/052591 dated Dec. 10, 2015 (2 pages).
(Continued)

*Primary Examiner* — Jeff W Natalini
*Assistant Examiner* — Steven L Yeninas
(74) *Attorney, Agent, or Firm* — Osha Liang LLP

(57) ABSTRACT

The present invention relates to a control device for controlling at least one function of a motor vehicle unit. Said control device includes a capacitive sensing surface (2) configured so as to detect a manual command from a user. Said control device is characterized in that it also comprises a device for detecting objects having ferromagnetic properties, said detection device including:—at least one magnetic field generation device (3) configured so as to generate a magnetic field on the capacitive sensing surface (2);—at least one device (4) for measuring the magnetic field generated by the magnetic field generation device (3); and—a device for monitoring the control (5), that is connected to the measurement device (4) and to the capacitive sensing sur-
(Continued)

face (2), and is configured so as to monitor the control signal emitted by the capacitive sensing surface (2) on the basis of the magnetic field measured by the measurement device (4) during detection of the command. The present invention also relates to a method for controlling such a device.

11 Claims, 3 Drawing Sheets

(51) Int. Cl.
*B60K 35/00* (2006.01)
*B60K 37/06* (2006.01)
*G01D 3/036* (2006.01)
*G01D 5/24* (2006.01)

(52) U.S. Cl.
CPC ...... *G06F 3/044* (2013.01); *B60K 2350/1004* (2013.01); *B60K 2350/106* (2013.01); *B60K 2350/1012* (2013.01); *B60K 2350/1024* (2013.01); *B60K 2350/1028* (2013.01); *B60K 2350/1036* (2013.01); *B60K 2350/352* (2013.01); *G01D 5/24* (2013.01)

(58) Field of Classification Search
USPC ......... 324/207.11–207.22, 207.26, 658–690; 340/5.72, 545.7, 561, 562, 686.6
See application file for complete search history.

(56) References Cited

U.S. PATENT DOCUMENTS

| | | | | |
|---|---|---|---|---|
| 2011/0254291 | A1* | 10/2011 | Rhein | E05B 81/76 292/336.3 |
| 2013/0257807 | A1* | 10/2013 | Harris | G06F 3/0418 345/175 |
| 2015/0062027 | A1* | 3/2015 | Yang | G06F 3/0488 345/173 |
| 2015/0212603 | A1* | 7/2015 | Raisch | G06F 3/044 345/174 |
| 2016/0078701 | A1* | 3/2016 | Guibbert | B60R 25/246 340/5.72 |

OTHER PUBLICATIONS

Written Opinion of the International Searching Authority issued in PCT/FR2015/052591 dated Dec. 10, 2015 (5 pages).

\* cited by examiner

MOTOR VEHICLE CONTROL DEVICE AND METHOD

The present invention relates to a control device for controlling at least one function of an automotive vehicle member, such as the opening and/or the closing of an access. The invention also relates to a method for controlling such a device.

Passenger compartments of automotive vehicles increasingly feature touch surfaces. Touch surfaces are generally configured to be activated by one or more fingers or through the use of a stylus. They replace conventional switches for the control of certain functions. Touch surfaces have the advantage of being streamlined and of generally comprising no relief. They generally make use of a capacitive technology. Any metal object having ferromagnetic properties, such as keys or a mobile telephone, positioned in proximity to the capacitive detection surface may therefore affect its behaviour (prevention of activation, unintentional activation, haphazard operation). A need therefore exists to safeguard such control systems, in particular to avoid unintentional commands being heeded.

One of the aims of the present invention is to propose a safeguarded control device and method allowing, in particular, unintentional commands to be ignored.

To this end, a subject of the present invention is a control device for controlling at least one function of an automotive vehicle member, comprising a capacitive detection surface configured to detect a manual command from a user, characterized in that it additionally comprises a device for detecting objects having ferromagnetic properties, said detection device comprising:

at least one magnetic field generation device, configured to generate a magnetic field at the capacitive detection surface;

at least one device for measuring the magnetic field generated by the magnetic field generation device; and a command monitoring device, connected to the measurement device and to the capacitive detection surface and configured to monitor the control signal transmitted by the capacitive detection surface as a function of the magnetic field measured by the measurement device during the detection of the command.

The magnetic field generation device and the measurement device do not affect the principle of detection. Thus, the measurement device may detect the presence of a metal object having ferromagnetic properties and provide the information to the command monitoring device, which will take appropriate measures such as inhibition of the command. This allows certain unintentional commands to be ignored when they are effected by an object other than the hand actuating the capacitive detection surface.

According to one or more features of the control device, either alone or in combination:

the magnetic field generation device comprises a permanent magnet;

the measurement device comprises a Hall effect probe;

said detection device comprises a plurality of measurement devices arranged at a distance from one another. This allows the dimensions of the detected metal object having ferromagnetic properties to be specified;

the measurement device and/or the magnetic field generation device are positioned on the back of the capacitive detection surface, on the side opposite that intended to detect a command;

said detection device comprises a ferromagnetic element extending between the magnetic field generation device and the measurement device, in order to guide the magnetic field lines toward the measurement device;

the control device is configured to control the opening and/or the closing of accesses of the automotive vehicle.

Another subject of the invention is a method for controlling at least one function of an automotive vehicle member by means of a control device such as described above, characterized in that it comprises steps for:

generating a magnetic field at the capacitive detection surface;

detecting a command by an exterior element and transmitting a control signal;

monitoring the control signal transmitted by the capacitive detection surface as a function of the magnetic field measured at the capacitive detection surface during the detection of the command.

According to one or more features of the control method, either alone or in combination:

the control signal transmitted by the capacitive detection surface is heeded when the magnetic field measured during the detection of the command is below a predetermined threshold;

the control signal transmitted by the capacitive detection surface generates a downgraded mode of the command when the magnetic field measured during the detection of the command is above a predetermined threshold. This downgraded mode may for example be a partial execution of the command, requiring the user to make repeated contact multiple times in order to succeed in fully effecting the command. The user is thus made aware of a malfunction in the control device but may nonetheless continue with the execution of the command;

a warning or diagnostic signal is transmitted when the magnetic field measured during the detection of the command is above a predetermined threshold.

Further features and advantages of the invention will become more clearly apparent from reading the following description, given by way of example and in no way limiting, in reference to the appended drawings, in which:

The same elements bear the same reference numbers in all the figures.

FIGS. 1 to 3 show an exemplary embodiment of a control device 1 for an automotive vehicle, for example positioned in the ceiling liner or the center console of the passenger compartment between the driver and passenger seats.

Figure 1:
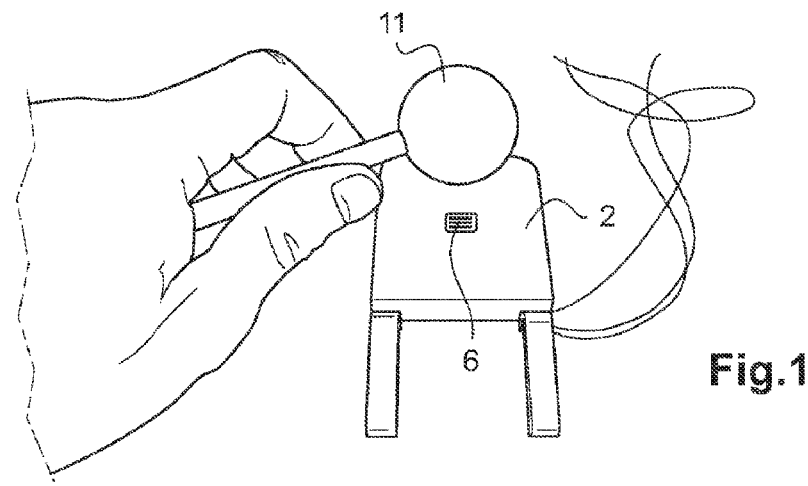
FIG. 1 shows elements of a control device, in particular the capacitive detection surface, during a safeguarding test, referred to as a "sphere test"
Figure 2:
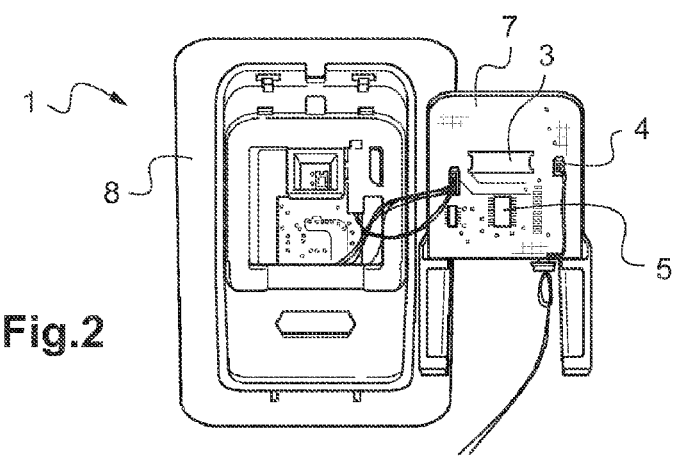
FIG. 2 shows the control device of FIG. 1, in the disassembled state.
Figure 3:
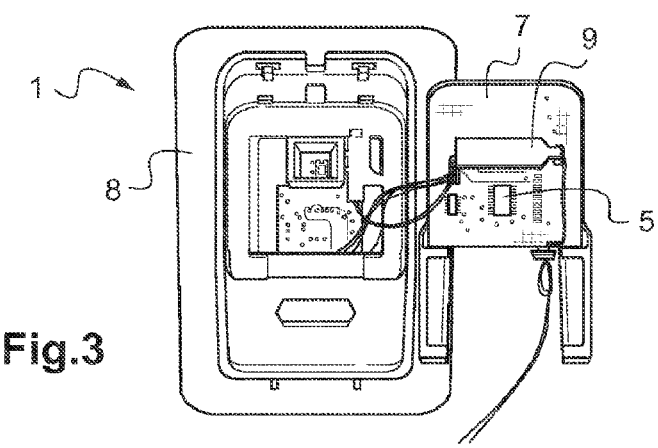
FIG. 3 shows a view similar to that of FIG. 2, after a ferromagnetic element is mounted in the housing.

The control device 1 allows a user to control at least one function of a member of the automotive vehicle, such as the opening and/or the closing of an access such as the roof, the windows, partitions, the trunk, the doors of the vehicle or the gas cap of the vehicle.

The control device 1 comprises a capacitive detection surface 2 and a device for detecting objects having ferromagnetic properties.

The device for detecting objects having ferromagnetic properties comprises at least one magnetic field generation device 3, at least one device 4 for measuring the generated magnetic field and one command monitoring device 5 connected to the measurement device 4 and to the capacitive detection surface 2.

The capacitive detection surface 2 is configured to detect an approach to or a contact with the surface by an exterior element, such as one or more fingers of a user, and to transmit a control signal for controlling at least one function when a manual command is detected.

The capacitive detection surface 2 comprises a capacitive sensor, such as an antenna, for example etched onto an electronic board 7 of the control device 1, such as a PCB (printed circuit board). The electronic board 7 is for example mounted in a housing 8 of the control device 1, for example made of plastic, covering the antenna. It is thus understood that the surface of the housing 8 forms the capacitive detection surface 2.

The magnetic field generation device 3 comprises for example a permanent magnet. The magnetic field generation device 3 is configured to generate a magnetic field at the capacitive detection surface 2, i.e. in a space defined by the capacitive detection surface 2 and the thickness in front of the capacitive detection surface 2 of the order of a few centimeters, for example less than 2 centimeters, The measurement device 4 comprises for example a Hall effect probe. Hall effect probes having an output voltage that varies in proportion to the value of the received induction are chosen, for example. A plurality of measurement devices 4 are for example arranged at a distance from one another in order to measure the magnetic field at various points on the capacitive detection surface 2.

Figure 5:
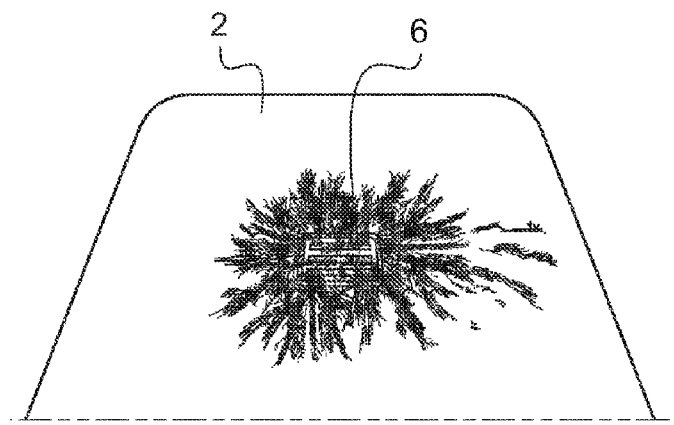
FIG. 5 shows the control device of FIG. 3, in the assembled state, in operation and on which iron filings have been placed.

The measurement device 4 and/or the magnetic field generation device 3 are for example positioned on the back of the capacitive detection surface 2, on the side opposite that intended to detect a command. For example and as can be seen in FIGS. 1 and 5, the magnetic field generation device 3 is positioned on the back of a pictogram 6.

The measurement device 4 and/or the magnetic field generation device 3 are for example positioned on the electronic board 7 bearing for example a device for backlighting the pictogram 6 and electronic tracks connecting, in particular, the terminals 12 of the measurement device 4 to the command monitoring device 5, for example on the side opposite that bearing the antenna.

Provision may additionally be made for the detection device to comprise a ferromagnetic element 9, such as made of electrical steel, in order to guide the magnetic field lines B toward the measurement device 4.

Figure 4:
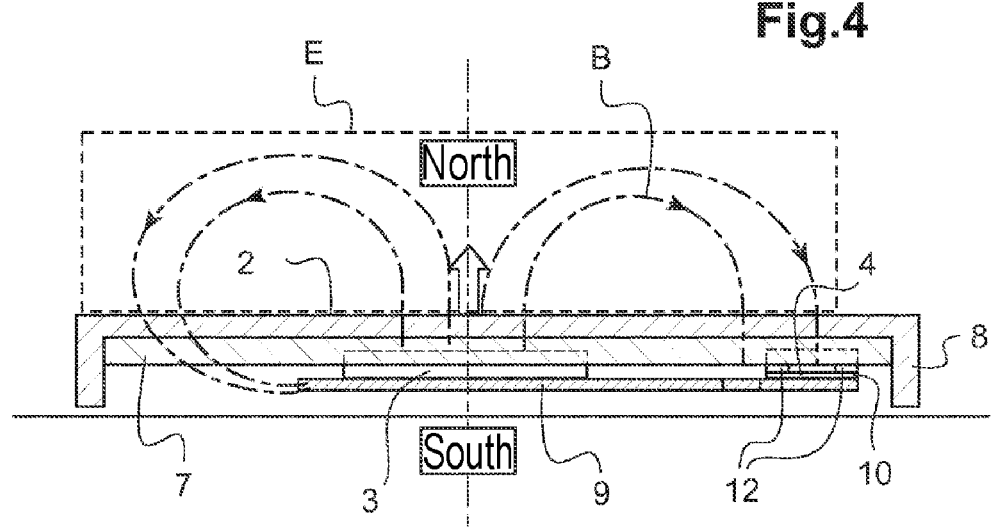
FIG. 4 shows a schematic side view of a control device in operation.

The ferromagnetic element 9 takes the form of an elongated plate, for example. It extends between the magnetic field generation device 3 and the measurement device 4. The plate is thus, for example, brought into contact with the permanent magnet of the magnetic field generation device 3. An electrical insulator 10 of low thickness may additionally be positioned between the ferromagnetic element 9 and the terminals 12 of the measurement device 4 (FIG. 4).

The command monitoring device 5 comprises for example a microprocessor, for example mounted on the electronic board 7 (or remote). The command monitoring device 5 is configured to monitor the control signal transmitted by the capacitive detection surface 2 as a function of the magnetic field measured by the measurement device 4 during the detection of the command.

For example, the control signal transmitted by the capacitive detection surface 2 is heeded when the magnetic field measured by the measurement device 4 during the detection of the command is below a predetermined threshold.

The command monitoring device 5 is additionally intended to be connected to a processing unit, such as an onboard computer, in order to transmit the control signal thereto. The control signal thus transmitted will subsequently be interpreted by the processing unit in order to carry out the function commanded at the capacitive detection surface 2, such as the command to close or open accesses of the automotive vehicle.

The command monitoring device 5 may thus, for example, transmit or not transmit the control signal to the processing unit and the corresponding function is or is not carried out.

According to another example, the control signal transmitted by the capacitive detection surface 2 generates a downgraded mode of the command when the magnetic field measured during the detection of the command is above a predetermined threshold. This downgraded mode may for example be a partial execution of the command, requiring the user to make repeated contact multiple times in order to succeed in fully effecting the command. The user is thus made aware of a malfunction in the control device 1 but may nonetheless continue with the execution of the command.

Provision may also be made for a warning or diagnostic signal to be transmitted when the magnetic field measured during the detection of the command is above a predetermined threshold, for example by transmitting or not transmitting a warning or diagnostic signal or by transmitting or not transmitting a warning or diagnostic signal to the processing unit.

In use, the magnetic field generation device 3 generates a magnetic field at the capacitive detection surface 2, in the space through which an exterior element coming into contact with the capacitive detection surface 2 is intended to pass. Thus, the field lines of the magnetic field B are shown by dotted lines in FIG. 4. The magnetic field lines B are also partially visible by virtue of the iron filings distributed across the capacitive detection surface 2 in FIG. 5.

The measurement device 4 measures the magnetic field thus generated, making it possible for example to determine the magnetic field values defining the absence of metal objects having ferromagnetic properties for which the command may be heeded.

When the user effects a command, he or she places his or her hand, in particular a finger, on the capacitive detection surface 2. At that moment, the capacitive detection surface 2 detects a command and transmits a control signal.

The command monitoring device 5 receives the control signal arising from the capacitive detection surface 2, along with the signal relating to the magnetic field measured by the measurement device 4. Depending on these signals, the command monitoring device 5 may for example transmit or not transmit the control signal to the processing unit and the corresponding function is or is not carried out.

For example, the command monitoring device 5 will:
if the value of the magnetic field measured by the measurement device 4 falls within a predetermined range when no exterior element is detected, transmit the control signals to the processing unit actuating the functions to be controlled; and if the value of the magnetic field measured by the measurement device 4 falls outside the predetermined range, not transmit the control signal arising from the capacitive detection surface 2 to the processing unit, thus avoiding an unintentional command being heeded.

As the hand of the user does not cause the magnetic field signal to vary, the command monitoring device 5 may therefore heed the control signal received by the capacitive detection surface 2 by transmitting it to the processing unit.

Figure 6:
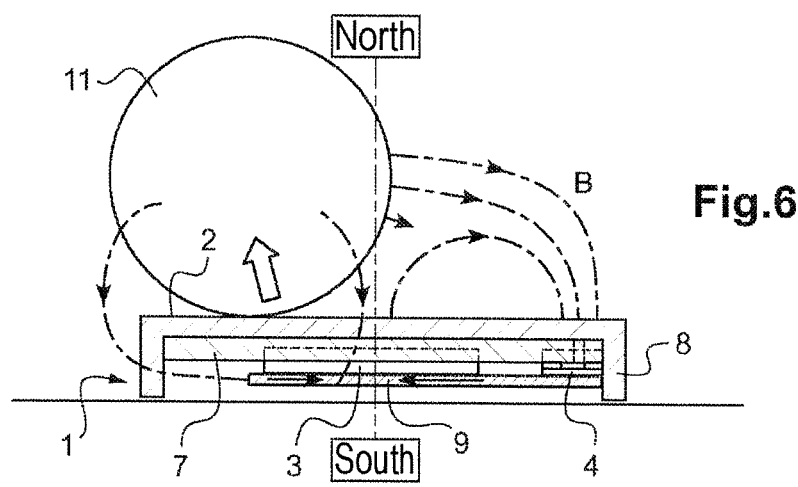
FIG. 6 is a schematic view similar to that of FIG. 4, during the sphere test.
Figure 7:
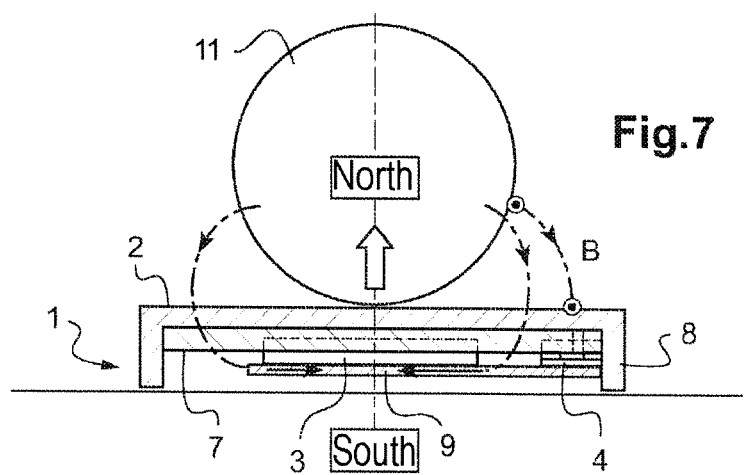
FIG. 7 is a view similar to that of FIG. 4, with the sphere in another position.
Figure 8:
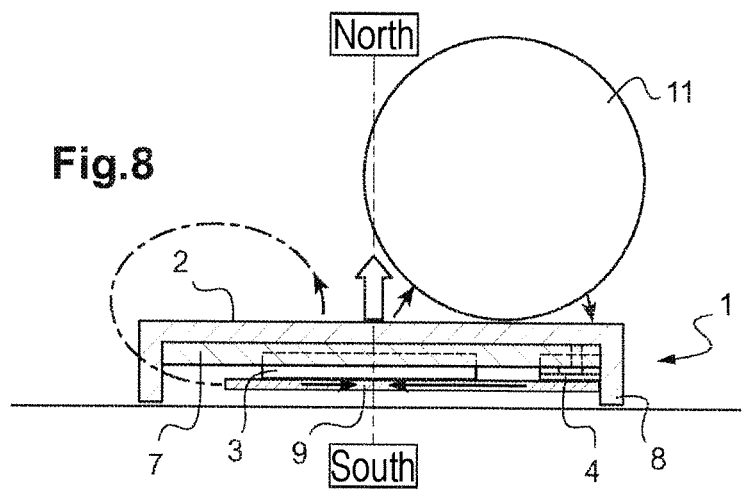
FIG. 8 is a view similar to that of FIGS. 6 and 7, with the sphere in another position.

However, any metal object having ferromagnetic properties, such as the keys of the user or a mobile telephone, coming into proximity to the capacitive detection surface 2, disrupts the field lines B of the magnetic field generation device 3, as can be seen in FIGS. 6, 7 and 8. The value of the magnetic field measured by the measurement device 4 is thus modified. It is higher, since the metal object having ferromagnetic properties concentrates the field lines B measured by the measurement device 4. In this manner, the control device 1 allows unintentional commands, for example those arising from the contact of keys or a mobile telephone with the capacitive detection surface 2, to be ignored.

It is also possible to carry out the sphere test in accordance with the standard FMVSS 118. Specifically, certain standards, in particular in the United States, require that touch control systems, in particular for automotive vehicles, not be activated by mistake. For example, the standard FMVSS 118 (Federal Motor Vehicle Safety Standard) in the United States, relating to the safeguarding of this type of touch control module, requires a test, referred to as a sphere test, to be carried out. In this test, a sphere 11 is applied against a touch pad for controlling a window, a partition or a roof, with a force not exceeding 135 newtons (30 pounds). During this test, the closing of the window, the partition or the roof must not be actuated. This test is illustrated in FIG. 1 and in FIGS. 6 to 8. The sphere 11 is made of stainless steel, with a radius of 20 mm+/−0.2 mm and has a surface finish of between 8 and 4 micro inches. The sphere 11 of this test models unintentional commands on the capacitive detection surface 2.

When carrying out the sphere test on the control device 1, the steel sphere 11 is applied against the capacitive detection surface 2 for controlling a function, such as the opening/closing of a window, partition or roof. At the moment of contact between the steel sphere 11 and the capacitive detection surface 2, the sphere 11 disrupts the field lines, modifying the value of the magnetic field. This magnetic field is measured by the measurement device 4 and is transmitted to the command monitoring device 5. Likewise, the control signal transmitted by the capacitive detection surface 2 having detected the sphere 11 is transmitted to the command monitoring device 5. As the measurement of the magnetic field indicates that it exceeds the predetermined threshold, the command monitoring device 5 ignores the control signal received by the capacitive detection surface 2 by not transmitting it to the processing unit. Thus, with calibration or a sufficiently accurate determination of the predetermined magnetic field threshold, the control device 1 makes it possible to carry out the sphere test in accordance with the FMVSS 118 standard.

The invention claimed is:

1. A control device for controlling at least one function of an automotive vehicle member, comprising:
a capacitive detection surface configured to detect a manual command from a user and transmit a control signal; and
a detection device for detecting objects having ferromagnetic properties, said detection device comprising:
at least one magnetic field generation device, configured to generate a magnetic field at the capacitive detection surface;
at least one measurement device for measuring the magnetic field generated by the magnetic field generation device; and
a command monitoring device, connected to the measurement device and to the capacitive detection surface and configured to monitor the control signal transmitted by the capacitive detection surface as a function of the magnetic field measured by the measurement device during the detection of the command,
wherein the control signal transmitted by the capacitive detection surface generates a downgraded mode of the command when the magnetic field measured during the detection of the command is above a predetermined threshold.

2. The control device as claimed in claim 1, in which the magnetic field generation device comprises a permanent magnet.

3. The control device as claimed in claim 1, in which the measurement device comprises a Hall effect probe.

4. The control device as claimed in claim 1, characterized in that said detection device comprises a plurality of measurement devices arranged at a distance from one another.

5. The control device as claimed in claim 1, wherein the measurement device and/or the magnetic field generation device are positioned on the back of the capacitive detection surface, on the side opposite that intended to detect a command.

6. The control device as claimed in claim 1, wherein said detection device comprises a ferromagnetic element extending between the magnetic field generation device and the measurement device, to guide the magnetic field lines toward the measurement device.

7. The control device as claimed in claim 1, wherein the control device is configured to control the opening and/or the closing of accesses of the automotive vehicle.

8. A method for controlling at least one function of an automotive vehicle member by a control device, comprising:
generating a magnetic field at a capacitive detection surface using a magnetic field generation device of a detection device, wherein the detection device is for detecting objects having ferromagnetic properties;
detecting a command by an exterior element at the capacitive detection surface; and
transmitting a control signal by the capacitive detection surface;
measuring the magnetic field generated by the magnetic field generation device using a measurement device of the detection device;
monitoring the control signal, by a command monitoring device connected to the measurement device and to the capacitive detection surface, transmitted by the capacitive detection surface as a function of the magnetic field measured at the capacitive detection surface during the detection of the command; and
generating a downgraded mode of the command by the control signal transmitted by the capacitive detection surface when the magnetic field measured during the detection of the command is above a predetermined threshold.

9. The control method as claimed in claim 8, wherein the control signal transmitted by the capacitive detection surface is heeded when the magnetic field measured during the detection of the command is below the predetermined threshold.

10. The control method as claimed in claim 8, wherein a warning or diagnostic signal is transmitted when the magnetic field measured during the detection of the command is above the predetermined threshold.

11. A method for controlling at least e function of an automotive vehicle member by a control device, comprising:
- generating a magnetic field at a capacitive detection surface using a magnetic field generation device of a detection device, wherein the detection device is for detecting objects having ferromagnetic properties;
- detecting a command by an exterior element at the capacitive detection surface;
- transmitting a control signal by the capacitive detection surface;
- measuring the magnetic field generated by the magnetic field generation device using a measurement device of the detection device;
- monitoring the control signal, by a command monitoring device connected to the measurement device and to the capacitive detection surface, transmitted by the capacitive detection surface as a function of the magnetic field measured at the capacitive detection surface during the detection of the command; and
- transmitting a warning or diagnostic signal when the magnetic field measured during the detection of the command is above a predetermined threshold.

* * * * *